Patented Oct. 26, 1948

2,452,429

UNITED STATES PATENT OFFICE 2,452,429

FUNGICIDAL COMPOSITIONS

Paul J. Carlisle, Wilmington, Del., and Wilbie S. Hinegardner, Niagara Falls, N. Y., assignors to E. I. du Pont de Nemours & Company, Wilmington, Del., a corporation of Delaware No Drawing. Application May 2, 1945,
Serial No. 591,634

7 Claims. (Cl. 167—22)

This invention relates to volatile fungicides and more particularly to fungicides in which formaldehyde vapor is an active fungicidal agent.

Formaldehyde vapor has been used extensively in the past to fumigate or disinfect rooms and other enclosed areas in an attempt to kill bacteria and fungi. Various devices such as formaldehyde candles, which volatilize a formaldehyde solution upon burning, and a chemical reaction between part of the formaldehyde solution, and an oxidizing agent to furnish heat to volatilize part of the remainder have been tried to get sufficient vapor into an enclosure to be of value as a disinfectant. Formaldehyde is also obtained by allowing paraformaldehyde, a linear polymer of formaldehyde sold commercially under that name, to evaporate.

Formaldehyde is used for disinfecting and fumigating because it kills many species of bacteria and fungi, small amounts are not particularly harmful, and its disagreeable odor warns anyone to keep out of the area.

However, formaldehyde vapor is not effective against many species of fungi, of which the common molds are examples, and relatively high concentrations are required together with careful control of humidity and temperature if it is to kill fungi in substantial numbers. Furthermore, many species of fungi are not killed by any practically attainable concentration of formaldehyde vapor. Paraformaldehyde does not give off sufficient vapor when exposed at ordinary temperatures to be of much value as a fungicide.

This invention has as an object a volatile fungicide that will kill essentially all fungi in an enclosed area and protect valuable materials from damage or destruction by fungus growth. A further object is to prepare an effective fungicide from paraformaldehyde that will effectively prevent the growth of all fungi when allowed to evaporate in an enclosed area. A further object is to devise a fungicide based on paraformaldehyde that does not require special means to insure sufficient fungicidal vapor in the enclosed space. Another object is an improved method for destroying or preventing the growth of fungi. Still other objects will be apparent from the following description.

These objects are accomplished by the discovery that certain chlorine derivatives of trimethyl acetonitrile hereinafter described, when mixed with paraformaldehyde and the mixture allowed to evaporate in an enclosed space, kill essentially all species of fungi. The effect is much more than the additive fungicidal properties of the two constituents as shown in the examples presented later. This additional effect, known as synergism, is unexpectedly large in the case of paraformaldedyde. No other material than paraformaldehyde, of a large number examined, showed such a high degree of synergism when paired with the chlorinated trimethyl acetonitriles. The maximum synergistic effect is obtained when paraformaldehyde makes up 50-90 per cent of the mixture. Still larger paraform concentrations may be used if desired; that is, the chlorinated trimethyl acetonitrile content may be less than 10 per cent and as low as 5 per cent. However, at such low concentrations of the chlorinated trimethyl acetonitrile the synergistic action is less marked. When paraformaldehyde becomes the minor constituent of the mixture of two materials; that is, 25 per cent or less, such mixtures are usually no longer completely fungicidal even though they are still more highly fungicidal than paraformaldehyde alone. The preferred concentration is 75-90 per cent paraformaldehyde.

The chlorine derivatives used in this invention are new compounds which are described and claimed in the copending patent application by Oliver W. Cass, Serial No. 580,701, filed March 2, 1945, now U. S. Patent 2,425,029. These compounds have the type formula $C_4H_{(9-x)}Cl_x \cdot CN$, in which $x$ is an integer having the value of 1 to 3, inclusive. Thus, these chlorine derivatives are:

Monochlorotrimethyl acetonitrile ($C_4H_8Cl \cdot CN$)
Dichlorotrimethyl acetonitrile ($C_4H_7Cl_2 \cdot CN$)
Trichlorotrimethyl acetonitrile ($C_4H_6Cl_3 \cdot CN$)

Structurally the compounds can be designated by the formula:

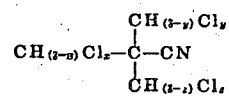

where $x=1$ to 3 and $y$ and $z=0$ to 3, and the sum of $x$, $y$, and $z$ is not greater than 3.

The monochloro derivative is a liquid which boils at about 175° C. The dichloro and trichloro derivatives exist in several isomeric modifications, all of which are suitable for the present invention. One of the two dichloro isomers is a volatile solid, which melts at 69–70° C. and boils at 207–208° C. The other dichloro isomer is a liquid, boiling in the range of 205 to 210° C. The trichloro derivatives are liquids, boiling in the range of 225–235° C.

These chlorine derivatives of trimethyl acetonitrile may be made by chlorinating trimethyl acetonitrile ((CH$_3$)$_3$C—CN) in the presence of light at a temperature of 70 to 165° C. The products can be separated from the crude chlorination product by fractional distillation. The solid dichloro isomer is obtained by cooling the dichloro fraction, whereupon the solid isomers separate by crystallization and can be filtered off.

In practicing the present invention, the solid dichloro isomer is preferred. However, the liquid isomers, or any desired mixture of them, may be used with good results. Such liquid mixtures also may contain the solid dichloro isomer, which is soluble in the liquid isomers. When the liquid chlorine derivatives are mixed with powdered or granular paraformaldehyde, the latter absorbs the liquid to form a composition having the properties of a solid when the paraformaldehyde concentration is 50 per cent by weight or higher.

We have discovered that the above-described chlorine derivatives of trimethyl acetonitrile, when mixed in the proportion of 5–50 per cent by weight with paraformaldehyde, exhibit the above-described synergistic effect and form a completely fungicidal vapor when allowed to vaporize into an enclosed space.

The invention is illustrated by the following examples:

Example 1

Ninety-five grams of commercial paraformaldehyde powder was mixed with five grams of powdered dichlorotrimethyl acetonitrile (solid isomer) and the mixture pelleted to approximately 0.1 g. each. The paraformaldehyde and dichlorotrimethyl acetonitrile were each pelleted separately. The three lots of pellets were each tested individually in a chamber prepared by putting similar halves of 4" Petri dishes together on the edges. Before fitting together, one of the halves had a small glass cup cemented in the center and the other a coating of standard nutrient agar as a medium for growing fungi. The nutrient agar was inoculated separately with six resistant species of fungi equally spaced in a circular pattern; namely, Monilia sp., *Aspergillus niger*, Penicilium sp., Spicaria sp., Rhizopus sp., and *Gliocladium fimbriatum*. One pellet of the material to be tested as a fungicide was placed in the cup and the half that had been inoculated inverted over the first part and their edges sealed together with adhesive tape. The Petri dishes were incubated at 30° C. for five days. The amount of growth for each species was recorded daily for the five days. Any fungi not growing during this time was transferred to fresh nutrient agar away from the fungicide to determine whether that species had been killed or merely prevented from growing; that is, to determine whether the action was fungicidal or merely fungistatic to that species of fungi.

In a number of tests one half of the species grew in the dish containing paraformaldehyde pellets. Four of the six species grew in the dish with dichlorotrimethyl acetonitrile and a fifth grew on transfer to a new medium. The dish with the mixed paraformaldehyde-dichlorotrimethyl acetonitrile pellet had no growth, and none of the species grew on transfer to a new medium.

When the amount of the mixture was reduced so that the vapor concentration could not exceed one gram of vapor per 1000 cc. of air, the mixed fungicide still prevented all fungi growth and none grew on transfer. At this latter concentration the individual separate constituents, paraformaldehyde and dichlorotrimethyl acetonitrile, had almost no killing effect on the fungi. In a third test at a concentration of one gram of vapor of the mixture per 10,000 cc. only two species of fungi grew.

Example 2

The three types of pellets described in Example 1 were further tested in similar chambers made from six-inch Petri dishes, but with ten additional resistant tropical fungi; namely, *Monilia crassa*, Aspergillus sp., *Aspergillus flavus*, Penicilium sp. (2 specimens), Stachybotrys sp., *Sporotrichum roseum*, Alternaria sp., *Aspergillus chevalieri*, and Mucor sp. When paraformaldehyde was used alone, only two of the fungi were killed. Dichlorotrimethyl acetonitrile killed only one. However, a mixture of the two compounds containing 5–50 per cent dichlorotrimethyl acetonitrile killed all ten fungi in every test. This test was also repeated with the mixture of paraformaldehyde and dichlorotrimethyl acetonitrile at 21–25° C. (room temperature). Again no species grew after inoculation nor upon transfer.

Example 3

The tests of Example 2 were repeated with a mixture of 75 per cent paraformaldehyde and 25 per cent dichlorotrimethyl acetonitrile, but ten resistant molds from the tropics that attack cellulose were substituted for the ten fungi used in Example 2. The mixture was completely fungicidal, though neither constituent alone killed 50 per cent of them.

Example 4

Example 1 was repeated on a mixture of paraformaldehyde 25 per cent+dichlorotrimethyl acetonitrile 75 per cent. This mixture allowed only two species of fungi to grow.

Example 5

Example 4 was repeated, except that the paraformaldehyde concentration was decreased to 10 per cent. The mixture allowed two species to grow.

Example 6

The tests of Example 1 were repeated with a mixture of 90 per cent paraformaldehyde and 10 per cent monochlorotrimethyl acetonitrile. The mixture was completely fungicidal, though paraformaldehyde alone under the same conditions killed only three fungi and the monochlorotrimethyl acetonitrile alone only three fungi.

Example 7

The tests of Example 1 were repeated with a mixture of 75 per cent paraformaldehyde and 25 per cent trichlorotrimethyl acetonitrile. The mixture was completely fungicidal. Trichlorotrimethyl acetonitrile alone permitted three of the species to grow and a fourth one on transfer, and paraformaldehyde alone permitted the growth of three species. The trichlorotrimethyl acetonitrile used in these tests was a mixture of the trichloro isomers.

The fungicidal compositions of matter herein described are solids that can be used as a powder or for convenience can be compressed into pellets. A small amount of lubricant such as magnesium stearate can be added to improve pelleting. Except for the lubricant, these pellets are almost completely volatile and leave essentially no residue for disposal.

If desired, other materials may be incorporated in the mixtures, such as finely divided solid inert diluents, or other fungicidal materials may be added. For some purposes, insecticides or known bactericides may also be added. The mixtures can be incorporated in suitable nonaqueous liquids for spraying purposes, for example in a liquid hydrocarbon.

For some purposes, dichlorotrimethyl acetonitrile can be used alone, i. e. in the absence of paraformaldehyde in combination with various diluents or other conventional ingredients as described above, to prepare fungicidal compositions.

These pellets or powdered mixtures offer a most convenient means for obtaining a fungicidal atmosphere in an enclosed space, but this method of making use of this synergistic effect is intended in no way to limit the scope of this invention. The two constituents can be introduced separately into the enclosed space without previous mixing. Thus, formaldehyde vapor can be added by any means, and 10-50 per cent of the second constituent can be introduced before or after the formaldehyde. If this mixed vapor is kept in the enclosed space by any means, it will still be fungicidal.

These mixtures are fungicidal within the range of temperature that fungi commonly grow and at any higher temperature desired.

The fungicidal compositions of matter described under this invention may be used to protect materials from fungi (molding) in any enclosed area where fungi grow. Materials stored in damp basements especially in hot weather nearly always mold. Leather goods, which are very apt to mold, can be preserved by these mixtures. Things packed for tropical shipment can be kept free of fungi. Molds in garbage pails can be prevented by this means. These volatile fungicides do not need to be placed in the materials to be protected, since the vapor alone will protect. In this way they are superior to contact fungicides. They are particularly effective in warm, damp places, since water vapor does not react with them to destroy their fungicidal properties, and fungi are prone to grow rapidly under such conditions.

The fungicidal mixtures claimed herein are essentially completely fungicidal under conditions usually encountered in enclosed spaces and are easy to apply. Elaborate or expensive equipment is not required. The fungicidal mixtures claimed herein are sufficiently harmless for general use.

We claim:

1. A fungicidal composition comprising a mixture of paraformaldehyde and a chlorine derivative of trimethyl acetonitrile having the formula $C_4H_{(9-x)}Cl_x$—CN, where $x=1$ to 3.

2. The composition according to claim 1 which contains not less than 50 per cent by weight of paraformaldehyde.

3. A fungicidal composition comprising a mixture of paraformaldehyde and a dichlorotrimethyl acetonitrile containing at least 50 per cent by weight of paraformaldehyde.

4. A fungicidal composition comprising a mixture of paraformaldehyde and solid dichlorotrimethyl acetonitrile containing from 50 per cent to about 90 per cent by weight of paraformaldehyde.

5. The method for preventing growth of fungi in an enclosed space which comprises simultaneously introducing into said space vapors of formaldehyde and at least one chlorine derivative of trimethyl acetonitrile having the formula $C_4H_{(9-x)}Cl_x$—CN, where $x=1$ to 3.

6. The method for preventing growth of fungi in an enclosed space which comprises simultaneously introducing into said space vapors of formaldehyde and a dichlorotrimethyl acetonitrile in such proportion that the formaldehyde vapor constitutes at least 50 per cent by weight of the combined vapors.

7. The method for preventing growth of fungi in an enclosed space which comprises simultaneously introducing into said space vapors of formaldehyde and solid dichlorotrimethyl acetonitrile in such proportion that the formaldehyde vapor constitutes from 50 per cent to about 85 per cent by weight of the combined vapors.

PAUL J. CARLISLE.
WILBIE S. HINEGARDNER.

REFERENCES CITED

The following references are of record in the file of this patent:

UNITED STATES PATENTS

| Number | Name | Date |
|---|---|---|
| 2,344,105 | Peters | Mar. 14, 1944 |

OTHER REFERENCES

Richardson, Jr. of Economic Entomology, vol. 36, June 1943, page 421.